(12) United States Patent
Kono et al.

(10) Patent No.: US 9,991,622 B2
(45) Date of Patent: Jun. 5, 2018

(54) ELECTRICAL COMPONENT COMPRISING INSULATING RESIN MOLDED ARTICLE, AND METHOD FOR STABILIZING FLAME RETARDANCE

(71) Applicant: ASAHI KASEI CHEMICALS CORPORATION, Tokyo (JP)

(72) Inventors: Hiroyuki Kono, Tokyo (JP); Kazuyuki Ogata, Tokyo (JP); Tadayuki Ishii, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 75 days.

(21) Appl. No.: 14/901,215

(22) PCT Filed: Jun. 30, 2014

(86) PCT No.: PCT/JP2014/067404
§ 371 (c)(1),
(2) Date: Dec. 28, 2015

(87) PCT Pub. No.: WO2015/002145
PCT Pub. Date: Jan. 8, 2015

(65) Prior Publication Data
US 2016/0372853 A1 Dec. 22, 2016

(30) Foreign Application Priority Data
Jul. 5, 2013 (JP) .................. 2013-142097

(51) Int. Cl.
| | |
|---|---|
| C08K 5/51 | (2006.01) |
| H01R 13/405 | (2006.01) |
| C08L 71/12 | (2006.01) |
| H01B 3/42 | (2006.01) |
| H01B 3/44 | (2006.01) |
| C08L 53/02 | (2006.01) |
| H01R 13/52 | (2006.01) |
| H01R 13/527 | (2006.01) |
| C08L 25/06 | (2006.01) |

(52) U.S. Cl.
CPC .......... *H01R 13/405* (2013.01); *C08L 53/025* (2013.01); *C08L 71/12* (2013.01); *C08L 71/123* (2013.01); *H01B 3/427* (2013.01); *H01B 3/441* (2013.01); *H01R 13/527* (2013.01); *H01R 13/5216* (2013.01); *C08L 25/06* (2013.01); *C08L 2201/02* (2013.01); *C08L 2201/08* (2013.01); *C08L 2203/206* (2013.01); *C08L 2205/03* (2013.01); *C08L 2207/04* (2013.01)

(58) Field of Classification Search
CPC .................. H01R 13/405; H01R 13/5216; H01R 13/527; H01B 3/427; C08L 2203/206; C08L 2201/08; C08L 2201/02; C08L 2205/03; C08L 2207/04
USPC .................................................. 524/136
See application file for complete search history.

(56) References Cited

U.S. PATENT DOCUMENTS

| | | | |
|---|---|---|---|
| 2002/0041960 A1 | 4/2002 | Danel et al. | |
| 2013/0303672 A1 | 11/2013 | Aoki | |
| 2014/0170900 A1 | 6/2014 | Ishii et al. | |
| 2014/0230887 A1 | 8/2014 | Eguchi et al. | |

FOREIGN PATENT DOCUMENTS

| | | |
|---|---|---|
| CN | 100432152 C | 11/2008 |
| CN | 103108917 A | 5/2013 |
| EP | 2617772 A1 | 7/2013 |
| JP | 2006-265539 A | 10/2006 |
| JP | 2010-189517 A | 9/2010 |
| JP | 2010189517 A * | 9/2010 |
| JP | 2012-134385 A | 7/2012 |
| JP | 2013-040288 A | 2/2013 |
| JP | 2013-133384 A | 7/2013 |
| JP | 2013-182805 A | 9/2013 |
| WO | 2011-090023 A1 | 7/2011 |
| WO | 2012-035976 A1 | 3/2012 |
| WO | 2012-063652 A1 | 5/2012 |
| WO | 2012-111628 A1 | 8/2012 |
| WO | 2012-161134 A1 | 11/2012 |

OTHER PUBLICATIONS

International Search Report issued with respect to application No. PCT/JP2014/067404, dated Sep. 22, 2014.
International Preliminary Report on Patentability issued with respect to application No. PCT/JP2014/067404, dated Jan. 5, 2016.

* cited by examiner

*Primary Examiner* — Hui Chin
(74) *Attorney, Agent, or Firm* — Greenblum & Bernstein, P.L.C.

(57) ABSTRACT

Provided is an electric component equipped with a live electrical part and an insulating resin molded article that is molded from a thermoplastic resin composition and is in contact with the live electrical part, wherein: the thermoplastic resin composition includes (A) 60 to 80 parts by mass of a polyphenylene ether resin or a mixture of a polyphenylene ether resin and a styrene resin, (B) 60 to 80 parts by mass of a hydrogenated block copolymer, (C) 5 to 30 parts by mass of a flame retardant, and (D) 0.1 to 3 parts by mass of titanium oxide (in an amount corresponding to 100 parts by mass of the total of (A) to (C)).

11 Claims, 2 Drawing Sheets

US 9,991,622 B2

ELECTRICAL COMPONENT COMPRISING INSULATING RESIN MOLDED ARTICLE, AND METHOD FOR STABILIZING FLAME RETARDANCE

TECHNICAL FIELD

The present invention relates to an electrical component provided having insulating resin molded article having stabilized aging characteristics, and a method for stabilizing flame retardance.

BACKGROUND ART

In recent years, with an increase in utilization of electrical energy, electrical components comprising an insulating resin molded article have been demanded in various applications.

In particular, an insulating resin molded article used for an electrical component, which is required to have electrical insulation properties including tracking resistant performance, has been demanded to have excellent flame retardance, mechanical properties, impact properties, water resistance, chemical resistance, dimensional stability, and the like in addition to excellent insulation properties.

Examples of a conventional resin material for electrical and electronic component applications include a polyester resin or a polyamide resin.

In addition, as a resin composition having improved tracking resistant performance and flame retardance, for example, a resin composition including a base resin, a halogen-based flame retardant and an oxygen acid ingredient has been proposed (see, for example, Patent Literature 1.).

Furthermore, a resin composition containing a phosphorous-based flame retardant, which is a non-halogen-based flame retardant, has been proposed (see, for example, Patent Literature 2.).

Moreover, a resin composition including a polycarbonate polyorganosiloxane copolymer, an alkali metal salt of an organic sulfonic acid, polytetrafluoroethylene, and a titanium dioxide particle having a covering layer has been proposed (see, for example, Patent Literature 3.).

On the other hand, as a material for a component being excellent in dimensional accuracy and containing a non-halogen-based flame retardant, polycarbonate (hereinafter, also designated as "PC".) and a modified polyphenylene ether (hereinafter, also designated as "modified PPE".) have been proposed.

Such resin materials are used for housings of electrical and electronic components, chassis components, and the like because of their characteristics.

Moreover, a thermoplastic resin composition including a polyphenylene ether resin, carbon black, and a carbonate and/or sulfate of an alkaline earth metal, and having improved tracking resistant performance has been proposed (see, for example, Patent Literature 4.).

CITATION LIST

Patent Literatures

Patent Literature 1: Japanese Patent Laid-Open No. 2006-265539

Patent Literature 2: Japanese Patent Laid-Open No. 2013-40288

Patent Literature 3: International Publication No. WO2012/063652

Patent Literature 4: International Publication No. WO2012/035976

SUMMARY OF INVENTION

Technical Problems

While a polyester resin and a polyamide resin are excellent in mechanical properties and chemical resistance, however, they have a problem that it is difficult to simultaneously satisfy such characteristics as well as dimensional stability, water resistance and the like.

In addition, the resin composition disclosed in Patent Literature 1 is prepared using a halogenated flame retardant, and therefore has the problem of being incapable of sufficiently satisfying recent environment and safety requirements.

Furthermore, the resin composition disclosed in Patent Literature 2 has the problem of being incapable of sufficiently ensuring flame retardance after heat ageing.

Moreover, the resin composition disclosed in Patent Literature 3 is a combination of polycarbonate and titanium oxide whose surface is specially treated, and has room for improvement in terms of mechanical properties, water resistance and dimensional stability.

Moreover, the thermoplastic resin composition disclosed in Patent Literature 4 is evaluated with respect to tracking only at 250 V and 275 V, so when the thermoplastic resin composition is used in a component to be applied at a voltage higher than such voltages, a longer creepage distance may be required, and thus it is difficult to provide a downsized component. In addition, the thermoplastic resin composition includes carbon black as an essential ingredient and has a problem of being restricted with respect to use in application having a color other than black.

In recent years, an insulating resin molded article for use in an electrical component in the field of electrical energy is used in a wide range of forms including a solar battery, a fuel battery, a storage battery, an electrical vehicle, an LED illumination and a smart meter.

Then, such an insulating resin molded article is demanded to be used in a downsized and multi-functionalized electrical component.

Therefore, it is increasingly difficult for an insulating resin molded article incorporated in an electrical component to ensure a sufficient insulation distance between live electrical parts for avoiding actuation failure due to tracking, and between such a live electrical part and the outer surface part of the insulating resin molded article.

Furthermore, in particular, a downsized electrical component is strongly demanded to have physical properties such as flame retardance, which are kept even after heat ageing, because the insulating resin molded article is easily affected by generation of heat of the live electrical part.

On the other hand, as described above, a resin composition prepared using, for example, a phosphorous-based flame retardant as a non-halogen-based flame retardant in terms of environment and safety requirements has been problematic in terms of deterioration in flame retardance after heat ageing.

In view of the conventional problems described above, the present invention focuses attention on a polyphenylene ether-based resin which simultaneously satisfies flame retardance, mechanical properties, water resistance and dimensional stability, and an object of the present invention is to provide an electrical component comprising a molded article of a thermoplastic resin composition including a polyphenylene ether-based resin, which can realize an increase in performance and a decrease in size.

That is, the object of the present invention is to provide an electrical component comprising an insulating resin molded article, which has tracking resistance so as to enable an insulation distance to be reduced, which is excellent in a balance between impact resistance and rigidity, and which can also have stabilized flame retardance after heat ageing even in the case of use of a phosphorous-based flame retardant.

Solution to Problem

The present inventors have made intensive studies in order to solve the above problems, and as a result, have found that, by using a molded article of a thermoplastic resin composition in which a hydrogenated block copolymer, a flame retardant and titanium oxide are added to a polyphenylene ether-based resin (hereinafter, also referred to as "PPE-based resin".) as an insulating resin molded article in contact with a live electrical part, in addition to original excellent resin performances, high tracking resistance, excellent impact resistance and excellent rigidity can be achieved, and stable flame retardance can be maintained even after heat ageing, and have completed the present invention.

That is, the present invention is as follows.

[1] An electrical component comprising:
a live electrical part, and
an insulating resin molded article in contact with the live electrical part, the molded article being a molded article of a thermoplastic resin composition, wherein
the thermoplastic resin composition comprises
(A) a polyphenylene ether-based resin or a mixed resin of a polyphenylene ether-based resin and a styrene-based resin,
(B) a hydrogenated block copolymer,
(C) a flame retardant, and
(D) titanium oxide,
a content of the (A) is 60 to 80 parts by mass,
a content of the (B) is 5 to 30 parts by mass,
a content of the (C) is 9 to 25 parts by mass, and
a content of the (D) is 0.1 to 3 parts by mass, based on the total of 100 parts by mass of the (A), (B) and (C), and
at least one creepage distance, which is a length between the live electrical part and an outer surface part of the electrical component that is electrically separated from the live electrical part by the insulating resin molded article, and which includes a length along a surface of the insulating resin molded article, is 15 mm or more and 40 mm or less.

[2] The electrical component according to [1], wherein the flame retardant (C) is a phosphoric acid-base flame retardant.

[3] The electrical component according to [1] or [2], wherein the hydrogenated block copolymer (B) is dispersed in the form of a particle, in the thermoplastic resin composition, and
an average particle size of the dispersed particles of the hydrogenated block copolymer (B) is 0.2 to 1.0 μm.

[4] The electrical component according to any one of [1] to [3], wherein a value obtained by dividing a Charpy impact strength (kJ/m$^2$) at 23° C. of the thermoplastic resin composition by a flexural modulus (GPa) at 23° C. of the thermoplastic resin composition (Charpy impact strength/flexural modulus) is 10 or more, and a burning level of the thermoplastic resin composition (thickness: 1.5 mm), measured according to UL94 vertical burning test, is V-0.

[5] The electrical component according to any one of [1] to [4], further comprising 0.01 to 1 part by mass of (E) a carbonate and/or sulfate of an alkaline earth metal based on the total of 100 parts by mass of the (A), (B) and (C).

[6] The electrical component according to any one of [1] to [5], wherein the content of the (A) is 65 to 75 parts by mass, the content of the (B) is 10 to 25 parts by mass and the content of the (C) is 10 to 20 parts by mass based on the total of 100 parts by mass of the (A), (B) and (C).

[7] The electrical component according to any one of [1] to [6], wherein a content of the (D) is 0.7 to 2.0 parts by mass based on the total of 100 parts by mass of the (A), (B) and (C).

[8] The electrical component according to any one of [1] to [7], wherein the mixed resin (A) of the polyphenylene ether-based resin and the styrene-based resin comprises 20% by mass or less of the styrene-based resin.

[9] An electrical component comprising:
a live electrical part, and
an insulating resin molded article in contact with the live electrical part, the molded article being a molded article of a thermoplastic resin composition, wherein
the thermoplastic resin composition comprises
(A) a polyphenylene ether-based resin or a mixed resin of a polyphenylene ether-based resin and a styrene-based resin, and
(B) a hydrogenated block copolymer,
a burning level of the thermoplastic resin composition (thickness: 1.5 mm), measured according to UL94 vertical burning test, is V-0,
an amount of the thermoplastic resin composition (test piece of 30 mm×30 mm) dropped until the occurrence of tracking in all of 300 V, 400 V, 500 V and 600 V in a tracking resistance test according to IEC60112 is 80 drops or more, and
at least one creepage distance, which is a length between the live electrical part and an outer surface part of the electrical component that is electrically separated from the live electrical part by the insulating resin molded article, and which includes a length along a surface of the insulating resin molded article, is 15 mm or more and 40 mm or less.

[10] The electrical component according to any one of [1] to [9], for use in a connector for a solar battery.

[11] The electrical component according to any one of [1] to [9], for use in a junction box for a solar battery.

[12] The electrical component according to any one of [1] to [9], for use in a wall adapter.

[13] A method for stabilizing flame retardance according to UL94 vertical burning test of thermoplastic resin composition comprising (A) a polyphenylene ether-based resin or a mixed resin of a polyphenylene ether-based resin and a styrene-based resin, (B) a hydrogenated block copolymer and (C) a flame retardant, comprising:
adding (D) a titanium oxide in the thermoplastic resin.

[14] The method for stabilizing flame retardance according to UL94 vertical burning test of a thermoplastic resin composition according to [13], wherein the (C) is a phosphoric acid-base flame retardant.

[15] The method for stabilizing flame retardance according to [13] or [14], wherein the flame retardance recited in [13] or [14] is flame retardance after heat ageing (after 500 hours at 150° C.), according to UL94 vertical burning test.

[16] The method for stabilizing flame retardance according to UL94 vertical burning test of a thermoplastic resin composition according to any one of [13] to [15], wherein, in the thermoplastic resin composition,
a content of the (A) is 60 to 80 parts by mass
a content of the (B) is 5 to 30 parts by mass,
a content of the (C) is 9 to 25 parts by mass, and
a content of the (D) is 0.1 to 3 parts by mass, based on the total of 100 parts by mass of the (A), (B) and (C).

Advantageous Effect of Invention

The present invention can provide an electrical component comprising an insulating resin molded article that is excellent in a balance among tracking resistance, impact resistance and rigidity, and that can maintain stable flame retardance even after heat ageing.

DESCRIPTION OF EMBODIMENTS

Figure 1:
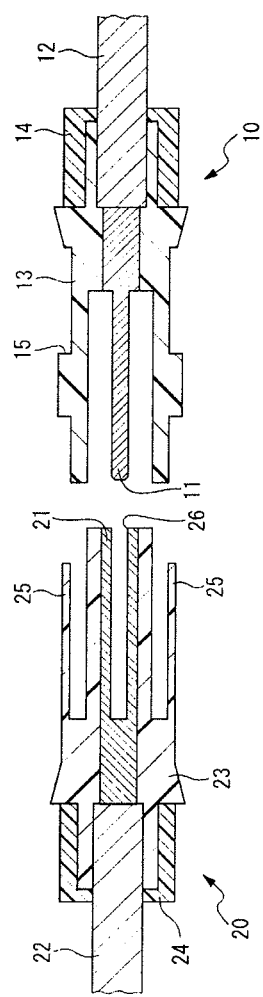
FIG. 1 illustrates a schematic cross-sectional view of one example of an electrical component of the present embodiment.

Hereinafter, an embodiment for carrying out the present invention (hereinafter, also designated as "the present embodiment".) is described in detail with reference to drawings.

The present invention is not intended to be limited to the following embodiment, and various modifications thereof can be carried out within the gist thereof.

Herein, the same elements are labeled with the same reference symbols in the drawings, and the overlapped description is omitted.

In addition, positional relationships such as above, below, left and light are based on the relationships illustrated in the drawings unless otherwise indicated, and the ratios of dimensions are not limited to the ratios illustrated in the drawings.

[Electrical Component]

An electrical component of the present embodiment includes a live electrical part, and an insulating resin molded article in contact with the live electrical part, the molded article being a molded article of a thermoplastic resin composition.

The thermoplastic resin composition contains (A) a polyphenylene ether-based resin or a mixed resin of a polyphenylene ether-based resin and a styrene-based resin (hereinafter, also designated as "ingredient (A)".), (B) a hydrogenated block copolymer (hereinafter, also designated as "ingredient (B)".), (C) a flame retardant (hereinafter, also designated as "ingredient (C)".) and (D) titanium oxide (hereinafter, also designated as "ingredient (D)".).

The content of the (A) is 60 to 80 parts by mass, the content of the (B) is 5 to 30 parts by mass, the content of the (C) is 9 to 25 parts by mass, and the content of the (D) is 0.1 to 3 parts by mass, based on the total of 100 parts by mass of the (A), (B) and (C).

At least one creepage distance including a length portion formed along the surface of the insulating resin molded article, which is a length between the live electrical part and the outer surface part of the electrical component in which the live electrical part is electrically separated by the insulating resin molded article is 15 mm or more and 40 mm or less.

The electrical component of the present embodiment comprises a live electrical part and an insulating resin molded article in contact with the live electrical part, the molded article being a molded article of a thermoplastic resin composition, as described above.

The live electrical part refers to a conductive member included in the electrical component and that is to be conducted in use, and its examples include a metal terminal and a conductive wire.

In the electrical component of the present embodiment, at least one creepage distance, which is a length between the live electrical part and the outer surface part of the electrical component that is electrically separated from the live electrical part by the insulating resin molded article, and which includes a length along the surface of the insulating resin molded article, is 15 mm or more and 40 mm or less.

Herein, the "outer surface part of the electrical component" means the outer surface part of the electrical component in use of the electrical component, namely, in the state of being conducted.

Herein, the "creepage distance" is defined as the shortest distance as measured along the surface of an insulator between two different live electrical parts or between a live electrical part and the bounding surface of the electrical equipment, as defined in, for example, JIS 6950-1.

In addition, the "bounding surface" is defined as the "outer surface of an electrical encloser under the assumption that a metal foil is pressed on a surface of an accessible insulator" according to the JIS standard.

That is, the "accessible insulator surface" refers to a "place on which fingers can put without any strong power", and when a metal foil is pressed on the accessible insulator surface to provide a surface having electrical conductivity, a "distance formed along the surface of an insulator, the distance being a distance between an original live electrical part and this metal foil" corresponds to the creepage distance. Alternatively, the creepage distance is defined as the shortest distance in measurement of a distance between a live electrical part and the bounding surface of electrical equipment along the surface of an insulator. When there are two routes passing between two different live electrical parts or between a live electrical part and the bounding surface of electrical equipment, the creepage distance refers to the shortest distance passing through a shorter route.

The "creepage distance" of the electrical component of the present embodiment is specifically described below with reference to the drawings, taking a case where the electrical component is a connector as an example.

As illustrated in FIG. 1, in the electrical component of the present embodiment, a connector for example, is configured from a male member 10 and a female member 20.

In the male member 10, a male terminal 11 as a live electrical part is connected to a predetermined electrical cable 12, and the male terminal 11 is surrounded by a tubular male insulating resin molded article 13.

The electrical cable 12 is secured to the male insulating resin molded article 13 by a cap 14.

In the female member 20, a female terminal 21 as a live electrical part is connected to a predetermined electrical cable 12, and the female terminal 21 is surrounded by a tubular female insulating resin molded article 23.

The electrical cable 22 is secured to the female insulating resin molded article 23 by a cap 24.

The female insulating resin molded article 23 comprises a snap-fit 25 for engaging the male member 10 and the female member 20, and the male insulating resin molded article 13 comprises a slit 15 into which the snap-fit 25 is inserted.

In addition, the female terminal 21 comprises an opening 26.

Figure 2:
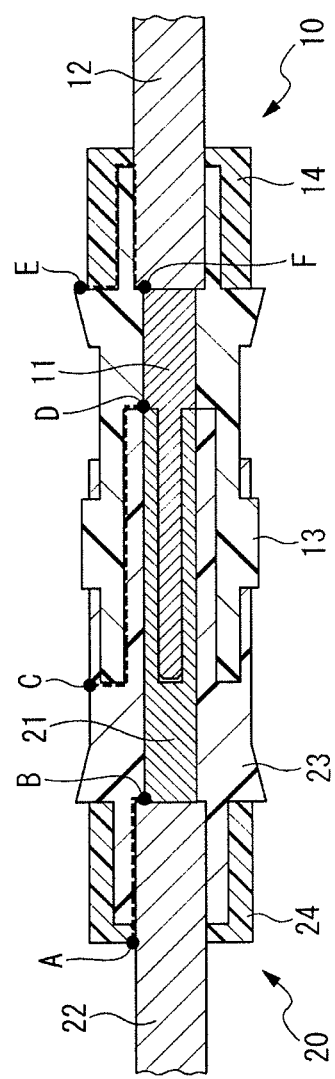
FIG. 2 illustrates an explanation view of the creepage distance by use of one example of an electrical component of the present embodiment.

As illustrated in FIG. 2, when the male member 10 and female member 20 are engaged, the snap-fit 25 is inserted into the slit 15 illustrated in FIG. 1 and the male terminal 11 is inserted into the opening 26 illustrated in FIG. 1, thereby allowing the conducting state between both the members 10 and 20 to be formed.

As illustrated in FIG. 2, the male terminal 11 and the female terminal 21, both of which are live electrical parts, are electrically separated from the outer surface part of the electrical component by the male insulating resin molded article 13 and the female insulating resin molded article 23, respectively.

Specifically, one example of the creepage distance is a distance between the outer surface part of the cap 24 of the female member 20 and the female terminal 21, which is the shortest distance including a length along the surface of the female insulating resin molded article 23, namely, the length of a dotted line AB.

Similarly, another example of the creepage distance is a length extending from the bounding portion between the male insulating resin molded article 13 and the female insulating resin molded article 23 engaged, to the bounding portion between the male terminal 11 and the female terminal 21 again engaged, which is the shortest distance including a length along the surfaces of both the insulating resin molded articles 13 and 23, namely, the length of a dotted line CD.

Similarly, another example of the creepage distance is a length extending from the bounding portion between the cap 14 and the male insulating resin molded article 13 to the bounding portion between the cable 12 and the male terminal 11, which is the shortest distance including a length along the surface of the male insulating resin molded article 13, namely, the length of a dotted line EF.

As described above, in the electrical component having an insulating resin molded article, more than one creepage distance can be present, since the electrical component consists of plural components.

The insulating resin molded article forming the electrical component of the present embodiment can be suitably used in electrical, power, thermal and optical transfer components and various insulation components in various industries such as vehicle, electrical and electronic, house, and energy industries, as well as housings and frameworks for accommodating or holding such components, or sheet or film-shaped molded articles.

Among them, the electrical component comprising an insulating resin molded article, of the present embodiment, can be suitably used in solar battery module applications such as a connector for a solar battery and a junction box for a solar battery, and wall adapter and inverter component applications.

The tracking resistance of the insulating resin molded article forming the electrical component of the present embodiment is important for maintaining safety in the electrical component for a long period. In particular, an electrical component, in which decreases in size and thickness have been recently advanced, is required to have a higher tracking resistance because a distance between conducting portions tends to be shorter.

The insulating resin molded article forming the electrical component of the present embodiment is obtained by molding a particular thermoplastic resin composition, and is excellent in insulation properties and impact resistance.

The impact resistance of the thermoplastic resin composition can be evaluated by the method in [Examples] described later.

The method for molding the thermoplastic resin composition includes, but not particularly limited, injection molding (including insert molding, hollow molding, multicolor molding, and the like), blow molding, compression molding, extrusion molding, thermoforming, and cutting from a thick plate.

Among them, injection molding is preferable in terms of mass productivity, and multicolor molding or metal insert molding is more preferable in terms of heat resistance, dimensional stability and rigidity.

In particular, when, for example, two-color molding with an elastomer is performed, the thermoplastic resin composition preferably has resistance to the elastomer additive that may bleed out after prolonged use.

The thermoplastic resin composition for providing the insulating resin molded article forming the electrical component of the present embodiment has the above composition, and thus has chemical resistance to the elastomer additive.

In order to enhance the chemical resistance to the elastomer additive, for example, it is effective to increase the content of the polyphenylene ether-based resin (A).

Herein, the chemical resistance to the elastomer additive can be evaluated by the method in [Examples] described later.

In addition, the thermoplastic resin composition for providing the insulating resin molded article forming the electrical component of the present embodiment is excellent in tracking property.

Specifically, in the insulating resin molded article forming the electrical component of the present embodiment, the number of drops of an electrolytic solution (aqueous 0.1% by mass ammonium chloride solution) dropped until the occurrence of tracking under the application of a voltage of 400 V in the tracking test according to IEC 60112 is preferably 50 drops or more in all of the five times the test was performed, more preferably 60 drops or more, further preferably 80 drops or more.

Additionally, the number of drops of the electrolytic solution until the occurrence of tracking under the application of a voltage of 600 V is preferably 80 drops or more in all of the five times the test was performed.

Herein, it is indicated that as the number of drops of the electrolytic solution in the tracking test is larger, tracking hardly occurs.

In addition, the tracking refers to a phenomenon where insulation properties are gradually impaired due to the occurrence of discharge between conducting portions to eventually cause conducting and igniting.

Accordingly, in order to prevent the tracking, it is preferable in the electrical component comprising an insulating resin molded article that a sufficient creepage distance be ensured between a live electrical part and the outer surface of the insulating resin molded article. As the creepage distance is longer, firing due to tracking of the insulating resin molded article is more easily prevented, but any measure in terms of design, such as an increase in dimension of the insulating resin molded article or an increase in the number of ribs, is required.

In the electrical component of the present embodiment, the thermoplastic resin composition for providing the insulating resin molded article forming the electrical component contains the polyphenylene ether-based resin (A), the hydrogenated block copolymer (B), the flame retardant (C) and the titanium oxide (D), and the contents of such ingredients can be specified in appropriate ranges to allow good tracking resistance to be exhibited, and to make the creepage distance shorter.

In the electrical component of the present embodiment, at least one creepage distance described above is 15 mm or more and 40 mm or less. By setting the creepage distance so as to be in the numerical range, good tracking resistance can thereby be exhibited. The creepage distance is preferably 20 mm or more and 40 mm or less, more preferably 20 mm or more and 30 mm or less.

When the creepage distance is more than 40 mm, good insulation performance can be maintained without using the thermoplastic resin composition in the present embodiment, but, in this case, a production process may become complicated due to taking said measures in terms of design, and it may become difficult to realize decrease in size of the electrical component.

By setting the creepage distance in the above range, an electrical component comprising an insulating resin molded article can be produced under less restriction in terms of shape design in order to prevent firing due to tracking.

The tracking resistance of the insulating resin molded article prepared by molding the thermoplastic resin composition can be evaluated by the method in [Examples] described later.

It is important in the electrical component comprising an insulating resin molded article, of the present embodiment, that the thermoplastic resin composition to be used for forming the insulating resin molded article have good impact resistance and rigidity.

The electrical component comprising an insulating resin molded article, of the present embodiment, is expected to be used not only in general household, but also under severe environmental conditions such as industrial plants and outdoors. Therefore, it is important that the electrical component has an impact resistance necessary for the case of dropping due to rough handling or a being hit by fallen object when outdoors; a rigidity necessary for being installed by use of snap fitting properties or a metal screw part; sufficient heat resistance for preventing deformation due to generation of heat from an internal component; and particularly a good balance between impact resistance and rigidity.

The insulating resin molded article forming the electrical component of the present embodiment has not only a high impact resistance, but also a sufficient rigidity required when it is used as a housing or a structure.

While rigidity and impact resistance are generally incompatible, the insulating resin molded article forming the electrical component of the present embodiment can have well-balanced enhanced rigidity and impact resistance by using a thermoplastic resin composition having a ratio of Charpy impact strength to flexural modulus as specified below.

The thermoplastic resin composition for use in the present embodiment preferably has a value obtained by dividing the Charpy impact strength (unit: $kJ/m^2$) at 23° C. by the flexural modulus (unit: GPa) at 23° C., (Charpy impact strength/flexural modulus), of 10 or more, more preferably 12 or more, further preferably 14 or more.

With respect to this relationship, the upper limit of the Charpy impact strength is not particularly limited, and the flexural modulus is preferably 1.5 GPa or more, more preferably 1.8 GPa or more.

When the flexural modulus is 1.5 GPa or more, an excellent rigidity during heating, for a molded article, is achieved.

The upper limit of the Charpy impact strength/flexural modulus is not particularly limited, and is preferably 40 or less, more preferably 30 or less, further preferably 20 or less, in terms of the balance between the impact resistance of the insulating resin molded article and the feel of rigidity indicating that a member made of the insulating resin molded article has snapped into another member.

In the thermoplastic resin composition for use in the present embodiment, the Charpy impact strength/flexural modulus at 23° C. can be controlled in the above range by setting the content of the polyphenylene ether-based resin or the mixed resin of a polyphenylene ether-based resin and a styrene-based resin (A) to 60 to 80 parts, and the content of the hydrogenated block copolymer (B) to 5 to 30 parts, respectively based on the total of 100 parts by mass of the (A), (B) and (C), and preparing the thermoplastic resin composition by a method described below, namely, by melt-kneading the ingredients with an extruder. [0024]

The thermoplastic resin composition for use in the present embodiment is excellent in impact resistance. For example, the Charpy impact strength at 23° C. is preferably 9 $kJ/m^2$ or more, more preferably 15 $kJ/m^2$ or more, further preferably 20 $kJ/m^2$ or more.

The upper limit of the Charpy impact strength at 23° C. is not particularly limited, but is preferably, for example, 100 $kJ/m^2$ or less from the viewpoint that the electrical component maintains rigidity and flame retardance.

Herein, in the present embodiment, the Charpy impact strength at 23° C. and the flexural modulus at 23° C. can be measured by the method in [Examples] described later.

The thermoplastic resin composition for use in the present embodiment preferably has a burning level of V-0, measured using a test piece having a thickness of 1.5 mm according to a UL-94 vertical burning test. Furthermore, it is more preferable that the burning level as measured by using a test piece having a thin thickness of less than 1.5 mm is also V-0.

In order to realize such burning level in the thermoplastic resin composition for use in the present embodiment, it is effective to produce the thermoplastic resin composition by a method described later.

(Thermoplastic Resin Composition)

The thermoplastic resin composition forming the electrical component of the present embodiment includes the polyphenylene ether-based resin or the mixed resin of polyphenylene ether and a styrene-based resin (A), the hydrogenated block copolymer (B), the flame retardant (C), and the titanium oxide (D).

The content of the (A) is 60 to 80 parts by mass, the content of the (B) is 5 to 30 parts by mass, the content of the (C) is 9 to 25 parts by mass, and the content of the (D) is 0.1 to 3 parts by mass, based on the total of 100 parts by mass of the (A), (B) and (C).

Hereinafter, the respective ingredients forming the thermoplastic resin composition are described in detail.

<(A) Polyphenylene Ether-Based Resin or Mixed Resin of Polyphenylene Ether-Based Resin and Styrene-Based Resin>

The polyphenylene ether-based resin forming the polyphenylene ether-based resin or the mixed resin of a polyphenylene ether-based resin and a styrene-based resin (A)

for use in the present embodiment is preferably a homopolymer or copolymer having repeating unit(s) represented by the following general formula (1) and/or general formula (2).

As described later, a modified unit having a modification group can also be used.

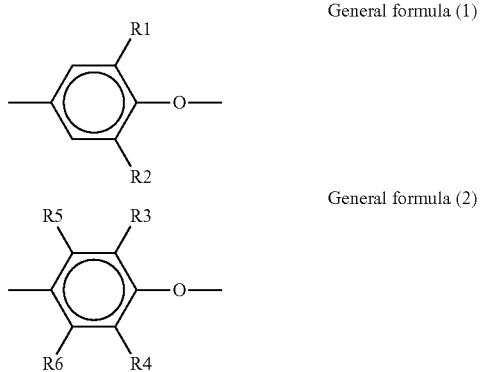

General formula (1)

General formula (2)

In the general formulae (1) and (2), R1, R2, R3, R4, R5 and R6 each independently represent a hydrogen atom, an alkyl group having 1 to 4 carbon atoms, an aryl group having 6 to 9 carbon atoms or a halogen atom, provided that R5 and R6 are not hydrogen at the same time.

Examples of the polyphenylene ether homopolymer include, but not limited to the following, poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloroethyl-1,4-phenylene)ether, poly(2-methyl-6-hydroxyethyl-1,4-phenylene)ether and poly(2-methyl-6-chloroethyl-1,4-phenylene)ether.

The polyphenylene ether copolymer refers to a copolymer having, as main repeating unit(s), the repeating unit(s) represented by the general formula (1) and/or general formula (2).

The "main" means that a content of the repeating unit(s) represented by the general formula (1) and/or general formula (2) in the polyphenylene ether copolymer is 60% by mass or more.

Examples of the polyphenylene ether copolymer include, but not limited to the following, a copolymer of 2,6-dimethylphenol and 2,3,6-trimethylphenol, a copolymer of 2,6-dimethylphenol and o-cresol, and a copolymer of 2,6-dimethylphenol, 2,3,6-trimethylphenol and o-cresol.

The polyphenylene ether-based resin is preferably poly(2,6-dimethyl-1,4-phenylene)ether in terms of thermal stability.

In addition, a polyphenylene ether including the 2-(dialkylaminomethyl)-6-methylphenylene ether unit or the 2-(N-alkyl-N-phenylaminomethyl)-6-methylphenylene ether unit described in Japanese Patent Laid-Open No. 63-301222 or the like as a partial structure is more preferable from the viewpoint of an improvement in thermal stability of the polyphenylene ether-based resin.

The reduced viscosity (unit: dl/g, chloroform solution, measured at 30° C.) of the polyphenylene ether-based resin is preferably in the range from 0.25 to 0.6, more preferably in the range from 0.35 to 0.55, in terms of fluidity, toughness and chemical resistance.

In the present embodiment, a modified polyphenylene ether obtained by partially or entirely modifying a polyphenylene ether by an unsaturated carboxylic acid or a derivative thereof can be used as the polyphenylene ether-based resin.

This modified polyphenylene ether is described in Japanese Patent Laid-Open No. 2-276823 (U.S. Pat. Nos. 5,159,027 and 35695), Japanese Patent Laid-Open No. 63-108059 (U.S. Pat. Nos. 5,214,109 and 5,216,089), and Japanese Patent Laid-Open No. 59-59724.

The modified polyphenylene ether can be produced by, for example, melt-kneading and reacting a polyphenylene ether and an unsaturated carboxylic acid or a derivative thereof in the presence or absence of a radical initiator. Alternatively, the modified polyphenylene ether can be produced by dissolving a polyphenylene ether and an unsaturated carboxylic acid or a derivative thereof in an organic solvent in the presence or absence of a radical initiator, and reacting them in the solution.

Examples of the unsaturated carboxylic acid or derivative thereof include, but not limited to the following, maleic acid, fumaric acid, itaconic acid, halogenated maleic acid, cis-4-cyclohexene 1,2-dicarboxylic acid and endo-cis-bicyclo(2,2,1)-5-heptene-2,3-dicarboxylic acid, and anhydrides, esters, amides and imides of these dicarboxylic acids, as well as acrylic acid and methacrylic acid, and esters and amides of these monocarboxylic acids.

In addition to the unsaturated carboxylic acid or derivative thereof, a saturated carboxylic acid that is by itself pyrolyzed at the reaction temperature in production of the modified polyphenylene ether, and that can become a derivative of the modified polyphenylene ether, which is the polyphenylene ether-based resin (A) for use in the present embodiment, can also be used. Specifically, the saturated carboxylic acid includes malic acid and citric acid.

These may be used singly or in combinations of two or more.

The polyphenylene ether-based resin is generally available as a powder.

With respect to the particle size of the polyphenylene ether-based resin, the average particle size is preferably 1 to 1000 μm, more preferably 10 to 700 μm, further preferably 100 to 500 μm.

The average particle size of the powder of the polyphenylene ether-based resin is preferably 1 μm or more in terms of handleability in processing, and is preferably 1000 μm or less from the viewpoint of inhibiting an unmelted portion from being generated in melt-kneading.

Herein, the average particle size of the powder of the polyphenylene ether-based resin can be measured by, for example, a laser particle size meter.

A mixed resin of a polyphenylene ether-based resin and a styrene-based resin can also be used as the ingredient (A).

The styrene-based resin refers to a polymer obtained by polymerizing a styrene-based compound, or a styrene-based compound and a compound copolymerizable with the styrene-based compound in the presence or absence of a rubber polymer.

Examples of the styrene-based compound include, but not limited to the following, styrene, α-methylstyrene, 2,4-dimethylstyrene, monochlorostyrene, p-methylstyrene, p-tert-butylstyrene and ethylstyrene, and styrene is preferable.

In addition, examples of the compound copolymerizable with the styrene-based compound include, but not limited to the following, methacrylate esters such as methyl methacrylate and ethyl methacrylate; unsaturated nitrile compounds such as acrylonitrile and methacrylonitrile; and acid anhydrides such as maleic anhydride, and such a compound is used together with the styrene-based compound. The amount of the compound copolymerizable with the styrene-based compound, to be used, is preferably 20% by mass or less, more preferably 15% by mass or less, based on the total amount of the compound and the styrene-based compound.

The rubber polymer includes a conjugated diene-based rubber, a copolymer of a conjugated diene and an aromatic vinyl compound, or an ethylene-propylene copolymer rubber. Specifically, polybutadiene and a styrene-butadiene copolymer are preferable. In addition, a partially hydrogenated polybutadiene having a degree of unsaturation of 80 to 20%, or a polybutadiene containing 90% or more of a 1,4-cis bond is preferably used as the rubber polymer.

Examples of the styrene-based resin include, but not limited to the following, polystyrene, a rubber-reinforced polystyrene, a styrene-acrylonitrile copolymer (AS resin), a rubber-reinforced styrene-acrylonitrile copolymer (ABS resin) and other styrene-based copolymer. In particular, a rubber-reinforced polystyrene combination of polystyrene and a partially hydrogenated polybutadiene having a degree of unsaturation of 80 to 20% is preferred.

The styrene-based resin in the ingredient (A) forming the thermoplastic resin composition for use in the present embodiment is preferably a homopolystyrene, and both atactic polystyrene and syndiotactic polystyrene can be used.

When the ingredient (A) is the mixed resin of a polyphenylene ether-based resin and a styrene-based resin, the content of the styrene-based resin is preferably 20% by mass or less, more preferably 10% by mass or less, further preferably 5% by mass or less based on 100% by mass of the ingredient (A).

Herein, the above styrene-based resin is used in the form of partially replacing the polyphenylene ether-based resin in the ingredient (A), and the amount of the polyphenylene ether-based resin in the ingredient (A) is decreased by the content of the styrene-based resin.

While fluidity is enhanced by an increase in the content of the styrene-based resin in the ingredient (A), the content is preferably 20% by mass or less in terms of heat resistance and flame retardance. When the content of the styrene-based resin is 20% by mass or less, a thermoplastic resin composition excellent in heat resistance and flame retardance is obtained, and when no styrene-based resin is added, a thermoplastic resin composition excellent particularly in heat resistance and thermal aging resistance is obtained.

In the thermoplastic resin composition for use in the present embodiment, the content of the ingredient (A) is, though arbitrarily varies depending on other ingredients, in the range from 60 to 80 parts by mass, preferably 65 to 80 parts by mass, more preferably 65 to 75 parts by mass based on 100 parts by mass of the total amount of the ingredient (A), the ingredient (B) and the ingredient (C).

When the content of the ingredient (A) is 60 parts by mass or more, a high heat resistant temperature and an excellent thermal aging resistance are achieved. In addition, when the content of the ingredient (A) is 80 parts by mass or less, good fluidity is achieved.

As the content of the ingredient (A) is decreased within the range, and the content of the ingredient (B) described later is increased, a thermoplastic resin composition excellent in impact resistance can be obtained.

<(B) Hydrogenated Block Copolymer>

The thermoplastic resin composition for use in the electrical component of the present embodiment contains the hydrogenated block copolymer (B).

As the hydrogenated block copolymer (B), a hydrogenated block copolymer obtained by hydrogenation of a block copolymer of styrene and a conjugated diene compound, namely, a block copolymer of a polystyrene block and a conjugated diene compound polymer block can be preferably used.

The rate of hydrogenation of an unsaturated bond derived from the conjugated diene compound in the ingredient (B) is preferably 60% or more, more preferably 80% or more, further preferably 95% or more.

When the ingredient (B) is a hydrogenated block copolymer obtained by hydrogenation of a block copolymer of styrene and a conjugated diene compound, the structure of the block copolymer before hydrogenation, of the ingredient (B), includes a structure having S—B—S, S—B—S—B, (S—B—)$_4$—Si, S—B—S—B—S, or the like, in which a styrene block chain is represented by S and a diene compound block chain is represented by B.

In addition, a microstructure of the diene compound polymer block can be arbitrarily selected.

The amount of vinyl bonds (the total of 1,2-vinyl bond and 3,4-vinyl bond) is preferably in the range from 2 to 60%, more preferably 8 to 40%, based on the total of bonds (the total of 1,2-vinyl bond, 3,4-vinyl bond and 1,4-bond) of the diene compound polymer.

As the hydrogenated block copolymer (B), at least one hydrogenated block copolymer preferably having a number average molecular weight of 150,000 to 350,000, more preferably 200,000 to 300,000 is preferably selected and used.

When the number average molecular weight of the hydrogenated block copolymer (B) is 150,000 or more, impact resistance of the thermoplastic resin composition tends to be excellent.

The impact resistance of the thermoplastic resin composition is enhanced in proportion to the number average molecular weight of the hydrogenated block copolymer (B), and a number average molecular weight of 150,000 or more allows a sufficient impact resistance in practical use to be achieved, while a number average molecular weight of 350,000 or less allows a low load in melt-kneading of the thermoplastic resin composition and excellent processing fluidity to be achieved so as to thereby make it possible to sufficiently disperse the ingredient (B) in the thermoplastic resin composition.

When the hydrogenated block copolymer (B) is a hydrogenated block copolymer obtained by hydrogenation of a block copolymer of styrene and a conjugated diene compound, at least one styrene polymer block chain preferably has a number average molecular weight of 15,000 or more, more preferably 20,000 or more and 50,000 or less. Further preferably, all of styrene polymer block chains have a number average molecular weight of 15,000 or more.

Herein, the number average molecular weight can be measured by gel permeation chromatography (GPC).

When the hydrogenated block copolymer (B) is a hydrogenated block copolymer obtained by hydrogenation of a block copolymer of styrene and a conjugated diene compound, the proportion of the styrene polymer block in the hydrogenated block copolymer (B) is preferably in the range from 10 to 70% by mass, more preferably in the range from 20 to 50% by mass in terms of a balance between fluidity and impact resistance, but is not particularly limited as long as the number average molecular weight of the styrene polymer block chain is in the above range.

As the hydrogenated block copolymer (B), two or more hydrogenated block copolymers having different composition and structure can also be used in combination.

For example, a hydrogenated block copolymer in which the content of a bound styrene polymer block is 50% by mass or more, and a hydrogenated block copolymer in which the content of the bound styrene polymer block is 30% by mass or less can be used in combination, hydrogenated block copolymers having a different molecular weight can be used in combination, or a hydrogenated random block copolymer obtained by hydrogenation of a block copolymer containing a random copolymer block of styrene and a conjugated diene can be used in combination.

In the thermoplastic resin composition for use in the present embodiment, the content of the hydrogenated block copolymer (B) is in the range from 5 to 30 parts by mass, preferably 10 to 25 parts by mass, more preferably 10 to 20 parts by mass, based on the total of 100 parts by mass of the ingredient (A), the ingredient (B), and the ingredient (C) described later.

When the content of the hydrogenated block copolymer (B) is 5 parts by mass or more, a thermoplastic resin composition excellent in impact resistance and tracking resistance is obtained, and when the content is 30 parts by mass or less, a thermoplastic resin composition excellent in flexural modulus, flame retardance, and stabilization of flame retardance after heat ageing is obtained.

When the content of the hydrogenated block copolymer (B) is 30 parts by mass or less, compatibility between the ingredient (A) and the ingredient (B) described above is good and occurrence of delamination in a molded article can be prevented.

In the thermoplastic resin composition for use in the present embodiment, the hydrogenated block copolymer (B) is dispersed in the form of a particle.

The average particle size of the particle of the ingredient (B), dispersed in the thermoplastic resin composition, is preferably 0.2 to 1.0 μm, more preferably 0.3 to 1.0 μm, further preferably 0.3 to 0.6 μm.

When the average particle size of the particle of the ingredient (B) is 0.2 to 1.0 μm, a thermoplastic resin composition excellent in impact resistance, a balance between impact resistance and flexural modulus, and excellent in tracking resistance is obtained.

By setting the content of the ingredient (A) to be 60 to 80 parts by mass as described above, and by setting the content of the ingredient (B) to be 5 to 30 parts by mass based on the total of 100 parts by mass of the (A), (B) and (C), and by employing a method for producing the thermoplastic resin composition described later, the average particle size of the particle of (B) can be controlled in the above range.

Herein, the average particle size of the particle of the ingredient (B), dispersed in the thermoplastic resin composition, can be measured by the method described in Examples later.

Furthermore, when the average particle size is measured using the molded product which is provided with the electrical component, it is preferable to perform measurement at a position of 5 mm or less from the flow-end, in order to reduce the influence of orientation due to molding.

<(C) Flame Retardant>

The thermoplastic resin composition for use in the present embodiment contains the flame retardant (C).

A preferable flame retardant (C) includes at least one selected from the group consisting of an inorganic flame retardant, a silicone compound and an organophosphorus compound.

The inorganic flame retardant includes, but not limited to, alkali metal hydroxides or alkaline earth metal hydroxides such as magnesium hydroxide and aluminum hydroxide containing crystalline water, and a zinc borate compound and a zinc stannate compound, which are each generally used as a flame retardant of a synthetic resin.

The silicone compound includes organopolysiloxane, or a modified product including organopolysiloxane. The silicone compound may be in the form of a liquid or a solid at ordinary temperature. The skeleton structure of organopolysiloxane may be either of a linear structure or a branched structure, and is preferably a branched structure or a three-dimensional structure having a trifunctional or tetrafunctional structure in the molecule. A bonding group of a main chain and a branched side chain of the silicone compound includes hydrogen or a hydrocarbon group, preferably a phenyl group, a methyl group, an ethyl group and a propyl group, and other hydrocarbon group may also be included as the bonding group. The terminal bonding group of the silicone compound may be any of a-OH group, an alkoxy group or a hydrocarbon group.

The silicone compound generally used for a flame retardant includes a polymer obtained by polymerization of any of four siloxane units (M unit: $R_3SiO_{0.5}$, D unit: $R_2SiO_{1.0}$, T unit: $RSiO_{1.5}$, Q unit: $SiO_2O$).

In the thermoplastic resin composition of the present embodiment, a preferable organopolysiloxane for the silicone compound for use in the flame retardant (C) is an organopolysiloxane which has preferably 60% by mol or more, more preferably 90% by mol or more, further preferably 100% by mol of a siloxane unit (T unit) represented by formula $RSiO_{1.5}$, in the total amount of the four siloxane units, and in which preferably at least 60% by mol, more preferably 80% by mol or more of a bonding hydrocarbon group in the entire siloxane unit represented by R in the entire siloxane compound used has a phenyl group.

As the organopolysiloxane as the flame retardant (C), a modified silicone can also be used in which the bonding group is substituted with an amino group, an epoxy group, a mercapto group or other modification group.

A modified product can also be used which is obtained by chemical adsorption or physical adsorption of the organopolysiloxane to an inorganic filler such as silica or calcium carbonate.

The organophosphorus compound as the flame retardant (C) includes, but not limited to, a phosphoric acid-base flame retardant and a phosphazene compound.

By adding the organophosphorus compound, an enhancement in flame retardance can be achieved, and any organophosphorus compound can be used as long as it is commonly used as a flame retardant.

A phosphoric acid-base flame retardant can be preferably used because of imparting particularly high flame retardance. As the phosphoric acid-base flame retardant, in particular, a phosphate compound is preferably used.

Examples of the phosphate compound include, but not limited to the following, triphenyl phosphate, trisnonyl phenyl phosphate, resorcinol bis(diphenyl phosphate), resorcinol bis[di(2,6-dimethylphenyl)phosphate], 2,2-bis{4-[bis(phenoxy)phosphoryloxy]phenyl}propane and 2,2-bis{4-[bis(methylphenoxy)phosphoryloxy]phenyl}propane.

Examples of a phosphorous-based flame retardant other than the above include, but not limited to the following, phosphate-based flame retardants such as trimethyl phosphate, triethyl phosphate, tributyl phosphate, trioctyl phosphate, tributoxyethyl phosphate, tricresyl phosphate, cresylphenyl phosphate, octyldiphenyl phosphate and diisopropyl phenyl phosphate; monophosphate compounds such as diphenyl-4-hydroxy-2,3,5,6-tetrabromobenzyl phosphonate, dimethyl-4-hydroxy-3,5-dibromobenzyl phosphonate, diphenyl-4-hydroxy-3,5-dibromobenzyl phosphonate, tris (chloroethyl)phosphate, tris(dichloropropyl)phosphate, tris (chloropropyl)phosphate, bis(2, 3-dibromopropyl)-2, 3-dichloropropyl phosphate, tris(2,3-dibromopropyl)phosphate, bis(chloropropyl)monooctyl phosphate, hydroquinonyl diphenyl phosphate, phenyl nonyl phenyl hydroquinonyl phosphate and phenyl dinonyl phenyl phosphate; and an aromatic condensed phosphate compound.

Among them, an aromatic condensed phosphate compound is preferable because of less generating gas in processing and being excellent in thermal stability and the like.

The aromatic condensed phosphate compound is generally commercially available, and for example, CR741, CR733S and PX200 produced by Daihachi Chemical Industry Co., Ltd., and FP600, FP700 and FP800 produced by ADEKA Corporation can be used therefor.

As the aromatic condensed phosphate compound, a condensed phosphate represented by the following formula (I) or formula (II) is preferable.

$m_1$, $m_2$, $m_3$, $m_4$, $n_1$ and $n_2$ are 0, and $R_{13}$ and $R_{14}$ are methyl groups, and preferably includes a condensed phosphate represented by the formula (I) where $Q_1$, $Q_2$, $Q_3$, $Q_4$, $R_{13}$ and $R_{14}$ are methyl groups, $n_1$ and $n_2$ are 0, and $m_1$, $m_2$, $m_3$ and $m_4$ are integers of 1 to 3, which contains 50% by mass or more of a phosphate whose n is in the range from 1 to 3, or preferably 1.

A particularly preferable one as the aromatic condensed phosphate compound described above includes an aromatic condensed phosphate compound having an acid value of 0.1 or less (value obtained according to JIS K2501), in terms of thermal aging resistance.

As the phosphazene compound as the flame retardant (C), phenoxyphosphazene and a crosslinked product thereof are preferable, and a phenoxyphosphazene compound having an acid value of 0.1 or less (value obtained according to JIS K2501) is more preferable in terms of thermal aging resistance.

In the thermoplastic resin composition for use in the present embodiment, the content of the flame retardant (C) varies depending on the flame retardance level required, and is in the range from 9 to 25 parts by mass, preferably in the range from 9 to 20 parts by mass, more preferably in the range from 10 to 20 parts by mass based on the total amount of 100 parts by mass of the ingredient (A), the ingredient (B) and the ingredient (C).

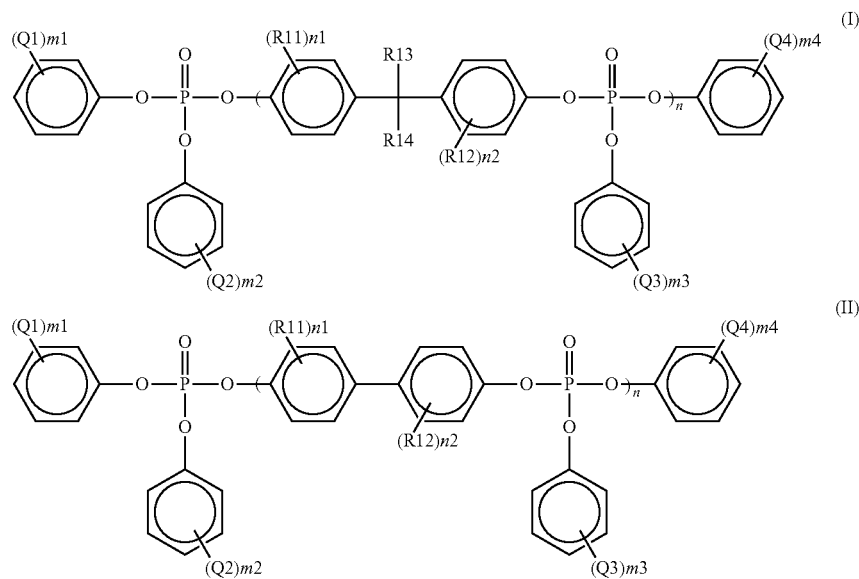

In the general formulae (I) and (II), $Q_1$, $Q_2$, $Q_3$ and $Q_4$ each represent a substituent, and each independently represent an alkyl group having 1 to 6 carbon atoms. $R_{11}$ and $R_{12}$ each represent a methyl group.

$R_{13}$ and $R_{14}$ each independently represent a hydrogen atom or a methyl group. n represents an integer of 1 or more, and $n_1$ and $n_2$ each independently represent an integer of 0 to 2. $m_1$, $m_2$, $m_3$ and $m_4$ each independently represent an integer of 0 to 3.

In the condensed phosphate represented by any of the formulae (I) and (II), n represents an integer of 1 or more, preferably an integer of 1 to 3 in each molecule, as described above.

In particular, a preferable condensed phosphate includes a condensed phosphate represented by the formula (I) where By setting the content of the flame retardant (C) so as to be 9 parts by mass or more, excellent flame retardance and tracking resistance can be imparted, and so as to be 25 parts by mass or less, a high impact resistance can be maintained, and a thermoplastic resin composition excellent in a balance between impact resistance and flexural modulus can thereby be provided.

<(D) Titanium Oxide>

The thermoplastic resin composition for use in the present embodiment contains the titanium oxide (D).

The primary particle size of the titanium oxide (D) in the form of a raw material is preferably 0.01 to 0.5 μm, more preferably 0.05 to 0.4 μm, further preferably 0.15 to 0.3 μm, in terms of a balance between dispersibility and handleability in production.

The titanium oxide (D) may include, as a surface treatment agent, at least one of hydrous oxides and/or oxides of aluminum, magnesium, zirconia titanium, tin, and the like, higher fatty acid salts such as stearate, or an organosilicon compound.

The titanium oxide (D) can be produced by a dry method or a wet method. The crystal structure of the titanium oxide (D) may be either of rutile type and anatase type structures, and is preferably a rutile type structure in terms of thermal stability of the thermoplastic resin composition for use in the present embodiment.

The amount of the titanium oxide (D) compounded is 0.1 to 3.0 parts by mass, preferably 0.5 to 2.5 parts by mass, more preferably 0.7 to 2.0 parts by mass based on the total amount of 100 parts by mass of the ingredient (A), the ingredient (B) and the ingredient (C).

The amount of the ingredient (D) compounded can be set to be 0.1 parts by mass or more based on the total amount of 100 parts by mass of the (A), the (B) and the (C) to result in an enhancement in tracking resistance, and can be set to be 3.0 parts by mass or less to thereby allow low-temperature impact strength to be ensured, allowing a balance between impact strength and flexural modulus to be good.

Furthermore, the thermoplastic resin composition including the ingredients described above can contain the titanium oxide (D) to result in stabilization of flame retardance after heat ageing of (A), (B) and (C).

[Method for Stabilizing Flame Retardance by Adding Titanium Oxide]

A method for stabilizing flame retardance of the present embodiment includes adding the titanium oxide (D) to the thermoplastic resin composition including the polyphenylene ether-based resin or the mixed resin of a polyphenylene ether-based resin and a styrene-based resin (A), the hydrogenated block copolymer (B), and the flame retardant (C).

The method can be performed to thereby allow the effect of achieving stable flame retardance (UL94 vertical burning test) of the thermoplastic resin composition even after heat ageing to be exerted.

In particular, the effect of stabilization of flame retardance is high in a case where the flame retardant (C) is a phosphoric acid-base flame retardant.

Herein, one example of "heat ageing" described above includes performing an aging test at 150° C. for 500 hours.

Moreover, in the method for stabilizing flame retardance of the present embodiment, the effect of stabilizing flame retardance (UL94 vertical burning test) of the thermoplastic resin composition is high in a case where the content of the (A) is 60 to 80 parts by mass, the content of the (B) is 5 to 30 parts by mass and the content of the (C) is 9 to 25 parts by mass based on the total of 100 parts by mass of the (A), (B) and (C), and the amount of the (D) added to the thermoplastic resin composition is 0.1 to 3 parts by mass.

(Other Ingredient)

The above thermoplastic resin composition may contain some material described later, in addition to the ingredients (A) to (D).

<(E) Carbonate and/or Sulfate of Alkaline Earth Metal>

The thermoplastic resin composition for use in the present embodiment may further contain (E) a carbonate and/or sulfate of an alkaline earth metal (hereinafter, also sometimes designated as "ingredient (E)".), in addition to the ingredients (A) to (D) described above.

The alkaline earth metal in the ingredient (E) is at least one element belonging to Group IIa in the periodic table, and is preferably calcium, barium, strontium or magnesium, more preferably calcium or barium.

The average particle size of the ingredient (E) is not particularly limited, and the average particle size is preferably 0.05 to 3 μm, more preferably, 0.05 to 1 μm.

The average particle size of the ingredient (E) can be obtained by observing the particle of the ingredient (E) in the form of a raw material by an electron microscope at 20000-fold magnification, and determining the arithmetic mean value.

The ingredient (E) may be used singly or as a mixture of two or more.

The content of the ingredient (E) in the thermoplastic resin composition for use in the present embodiment is preferably 0.01 to 1.0 part by mass, more preferably 0.01 to 0.5 parts by mass, further preferably 0.01 to 0.1 parts by mass based on the total amount of 100 parts by mass of the ingredient (A), the ingredient (B) and the ingredient (C).

By setting the content of the ingredient (E) to be 0.01 parts by mass or more, stabilization of tracking resistance can be achieved, and by setting to be 1.0 part by mass or less, good impact resistance in practical use can be obtained.

<Other Additives>

The thermoplastic resin composition for use in the present embodiment may also contain other additive(s) for imparting desired characteristics as long as the effect of the present invention is not impaired.

Examples of other additive(s) include, but not limited to, a heat stabilizer, an ultraviolet absorber, a light absorber, a plasticizer, an antioxidant, various stabilizers, an antistatic agent, a release agent, a dye or pigment, an epoxy compound, and a resin other than the ingredient (A), such as polyethylene.

Such other additives are preferably black in color because of being often used out of doors in solar battery module applications, such as a connector for a solar battery and a junction box for a solar battery, which are suitable applications of the electrical component of the present embodiment. Therefore, carbon black is preferably contained as a pigment.

A preferable content of carbon black is preferably 0.1 to 3.0 parts by mass, more preferably 0.1 to 1.0 part by mass, further preferably 0.2 to 0.6 parts by mass based on the total amount of 100 parts by mass of the ingredients (A) to (D) described above. When the content is 0.1 to 3.0 parts by mass, a thermoplastic resin composition having a good appearance is obtained, and even when the titanium oxide is contained, a thermoplastic resin composition displaying a sufficient black color is obtained.

Conventionally known flame retardant and flame retardant auxiliary agent other than the above ingredient (C) can also be compounded, and therefore can also further enhance flame retardance.

Examples of the flame retardant and flame retardant auxiliary agent other than the ingredient (C) include, but not limited to, inorganic silicon compounds such as kaolin clay and talc.

Furthermore, an inorganic filler such as a glass fiber or glass flake, or other fiber reinforcing agent can also be compounded, and thus a thermoplastic resin composition further excellent in dimensional accuracy and heat resistance is obtained.

The thermoplastic resin composition for use in the present embodiment can also contain other polymer or oligomer. Examples of other polymer or oligomer described include, but not limited, a petroleum resin, a terpene resin and a hydrogenated resin thereof, a coumarone resin and a coumarone-indene resin as fluidity improving agents, or a silicone resin or a phenol resin etc for an improvement in flame retardance.

[Method for Producing Thermoplastic Resin Composition]

The thermoplastic resin composition for use in the present embodiment can be obtained by melt-kneading the above respective ingredients by an extruder.

As the extruder, a twin screw extruder is suitable.

Examples of the twin screw extruder include, but not limited to, a twin screw extruder equipped with a pressure-reducing vent port, in which the screw diameter is 58 mm and the number of barrels is 13.

The method for producing the thermoplastic resin composition using the twin screw extruder is specifically described.

For example, in melt-kneading, the ingredient (A), the ingredient (B) and the ingredient (D), and optionally the ingredient (E) are fed via a first feed port of a barrel 1 located upstream in the flowing direction of the twin screw extruder.

Thereafter, the ingredient (C) is fed from an injection nozzle to the side of the extruder by using a gear pump via a second (liquid) feed port located downstream of the first feed port, and then extrusion is performed.

With respect to the screw structure of the twin screw extruder, an unmelted-mixing zone preferably occupies 45 to 75%, more preferably 60 to 70% from the upstream of the barrel when the total barrel length is assumed to be 100%.

In the twin screw extruder, a kneading element (phase of 45 degrees) (usually designated as R), a kneading element (phase of 90 degrees) (usually designated as N) or a kneading element (negative phase of 45 degrees) (usually designated as L) is preferably used in a melt-kneading zone, and a kneading element (phase of 45 degrees) (usually designated as R) is preferably used in the unmelted-mixing zone after the flame retardant (C) is fed via the second feed port.

The screw in the melt-kneading zone preferably has, but not limited to, for example, a screw configuration in which a kneading disc R (normal thread screw element in which 3 to 7 discs are combined at a twisting angle of 15 to 75 degrees and the L (screw length)/D (screw diameter) is 0.5 to 2.0), a kneading disc N (neutral screw element in which 3 to 7 discs are combined at a twisting angle of 90 degrees and the L/D is 0.5 to 2.0), a kneading disc L (reverse thread screw element in which 3 to 7 discs are combined at a twisting angle of 15 to 75 degrees and the L/D is 0.5 to 1.0), and the like are appropriately combined, and a screw element such as a reverse thread screw (double-start reverse thread screw element in which the L/D is 0.5 to 1.0), an SME screw (screw element having an improved kneading property by a notched normal thread screw, in which the L/D is 0.5 to 1.5), a ZME screw (screw element having an improved kneading property by a notched reverse thread screw, in which the L/D is 0.5 to 1.5), and the like may also be appropriately incorporated in a screw structure to perform kneading.

In melt-kneading in the production process of the thermoplastic resin composition for use in the present embodiment, evacuation is further preferably performed.

In addition, the resin temperature in melt-kneading is preferably in the range from 290 to 350° C. Specifically, the temperature of the front part of the twin screw extruder is preferably in the range from 150 to 250° C., the temperature of the rear part thereof is preferably in the range from 250 to 330° C., and the resin temperature at the die outlet is preferably in the range from 290 to 350° C., but not particularly limited.

The number of rotations of the screw of the twin screw extruder is preferably in the range from 150 to 600 rpm.

A thermoplastic resin composition in which the particles of the hydrogenated block copolymer (B) are dispersed in the range of from 0.2 to 1.0 μm is obtained by producing the thermoplastic resin composition according to the above production method. Thus, a thermoplastic resin composition excellent in tracking resistance, impact resistance and flame retardance is obtained.

[Method for Producing Electrical Component]

The electrical component of the present embodiment can be produced by molding the thermoplastic resin composition into a predetermined shape depending on the application to provide an insulating resin molded article, and combining the molded article with a predetermined live electrical part depending on the application.

The molding method includes, but not particularly limited to, injection molding (including insert molding, hollow molding, multicolor molding, and the like), blow molding, compression molding, extrusion molding, thermoforming, and cutting out from a thick plate.

Among them, injection molding is preferable in terms of mass productivity, and multicolor molding or metal insert molding is more preferable in terms of heat resistance, dimensional stability and rigidity.

In particular, two-color molding with an elastomer is suitable because the thermoplastic resin composition has resistance to an elastomer additive that will bleed out after a long period of use.

Examples of the live electrical part include a metal terminal and a conductive wire, while the live electrical part can be variously selected depending on the application of the electrical component.

(Other Example of Electrical Component)

Another example of the electrical component of the present embodiment includes an electrical component comprising a live electrical part and an insulating resin molded article in contact with the live electrical part, the molded article being a molded article of a thermoplastic resin composition, wherein the thermoplastic resin composition contains the polyphenylene ether-based resin or the mixed resin of a polyphenylene ether-based resin and a styrene-based resin (A), and the hydrogenated block copolymer (B), the burning level of the thermoplastic resin composition (thickness: 1.5 mm), measured according to UL94 vertical burning test, is V-0, the amount of the thermoplastic resin composition (test piece of 30 mm×30 mm) dropped until the occurrence of tracking in all of 300 V, 400 V, 500 V and 600 V in a tracking resistance test according to IEC60112 is 80 drops or more, and at least one creepage distance, which is a length between the live electrical part and the outer surface part of the electrical component that is electrically separated from the live electrical part by the insulating resin molded article, and which includes a length along the surface of the insulating resin molded article, is 15 mm or more and 40 mm or less.

The thermoplastic resin composition can be produced by melt-kneading the ingredient (A) and the ingredient (B), and optionally other ingredient.

The insulating resin molded article can be produced by molding the thermoplastic resin composition into a predetermined shape.

The electrical component can be produced by combining the insulating resin molded article with a predetermined live electrical part depending on the application.

The UL94 vertical burning test can be performed by the method in [Examples] described later.

The tracking property test can be performed by the method in [Examples] described later.

[Application]

The electrical component of the present embodiment can be used in internal parts components of office equipment as industrial equipment, measuring equipment, chassis, and electrical equipment, electrical and electronic components for use in a wall adapter for household electrical appliances and the like, a storage medium and a drive thereof, sensor equipment, a terminal block, and a second battery, a fuel battery, a solar battery, solar power generation, geothermal generation, wind power generation, a smart meter and the like in the energy and environment fields, electrical components constituting a power transmission facility, a cable terminal, a vehicle part, a connector for a solar battery, a junction box for a solar battery, and components for hybrid vehicle and electrical vehicle. In particular, the electrical component is preferably used in a connector for a solar battery, a junction box for a solar battery, or a wall adapter.

EXAMPLES

Hereinafter, the present invention is described with reference to specific Examples and Comparative Examples, but the present invention is not limited thereto.

Ingredients used in each of Examples and each of Comparative Examples are as follows.

[Ingredient (A)]

(PPE: polyphenylene ether-based resin)

Poly-2,6-dimethyl-1,4-phenylene ether: product name "Zylon S201A" produced by Asahi Kasei Chemicals Corporation.

(PS: polystyrene)

Homopolystyrene: product name "PSJ-polystyrene 685" produced by PS Japan Corporation.

(HIPS: high impact polystyrene)

High impact polystyrene: product name "PSJ-polystyrene H9302" produced by PS Japan Corporation.

[Hydrogenated Block Copolymer (B)]

The following hydrogenated block copolymer (bonding structure of polystyrene-poly(ethylene-butylene)-polystyrene) obtained by hydrogenation of a styrene-butadiene block copolymer (bonding structure of polystyrene-polybutadiene-polystyrene) was used.

(SEBS-1)

Hydrogenated block copolymer (number average molecular weight: 250,000, styrene polymer block: 33% by mass, hydrogenation rate of butadiene unit: 98% or more): product name "Kraton G1651" produced by Kraton Polymers LLC.

(SEBS-2)

Hydrogenated block copolymer (number average molecular weight: 80,000, styrene polymer block: 60% by mass, hydrogenation rate of butadiene unit: 98% or more): product name "Septon 8104" produced by Kuraray Co., Ltd.

(SEBS-3)

Hydrogenated block copolymer (number average molecular weight: 80,000, styrene polymer block: 30% by mass, hydrogenation rate of butadiene unit: 98% or more): registered trademark "Kraton G1650" produced by Kraton Polymers LLC.

In the present Examples, the number average molecular weight was measured by gel permeation chromatography (GPC), the amount of the styrene polymer block was measured by the osmium tetroxide decomposition method, and the hydrogenation rate of the butadiene unit was measured by infrared spectroscopy and nuclear magnetic resonance spectrometry.

[Flame Retardant (C)]

The following phosphate flame retardant was used.

(FR-1)

Bisphenol A-based condensed phosphate: product name "CR-741" produced by Daihachi Chemical Industry Co., Ltd.

[Titanium Oxide (D)]

(D-1)

Titanium dioxide having an average particle size of 0.2 μm (D-2)

Titanium dioxide having an average particle size of 0.05 μm

With respect to the average particle size, the particle of the ingredient (D) was observed using an electron microscope at 20000-fold magnification, and the arithmetic mean value determined from the maximum diameters of 20 particles was obtained by calculation and was defined as the average particle size.

[(E) Carbonate and/or Sulfate of Alkaline Earth Metal]

(E-1)

Barium sulfate having an average particle size of 0.8 μm.

(E-2)

Calcium carbonate having an average particle size of 0.15 μm.

With respect to the average particle size, the particle of the ingredient (E) was observed using an electron microscope at 20000-fold magnification, and the arithmetic mean value determined from the maximum diameter of 20 particles was obtained by calculation and was defined as the average particle size.

[(F) Carbon Black]

The following carbon black was used.

(F-1) product name "Mitsubishi carbon black #52" produced by Mitsubishi Chemical Corporation

[Method for Evaluating Characteristics of Thermoplastic Resin Composition]

Characteristics of the thermoplastic resin composition produced in each of Examples and Comparative Examples described later were evaluated according to the following methods and conditions.

(Production of Test Piece)

The pellet of the thermoplastic resin composition produced in each of Examples and Comparative Examples described later was dried at 100° C. for 2 hours, and thereafter an IS-100GN type injection molding machine manufactured by Toshiba Machine Co., Ltd. (the cylinder temperature was set to be 280° C. and the mold temperature was set to be 80° C.) was used to produce a test piece according to ISO-15103 and a flat plate of 150 mm×150 mm×3 mm.

(Measurement of Average Particle Size)

The average particle size of the hydrogenated block copolymer (B) dispersed in the form of a particle in the thermoplastic resin composition was measured according to the following.

The test piece according to ISO-15103, produced as described above (production of test piece), was used, and the flow-end area of the test piece was selected to produce an ultrathin piece.

Next, the ultrathin piece was stained by ruthenium tetroxide and thereafter photographed using a transmission electron microscope.

The photograph at 20000-fold magnification (field of view: 15 cm×12 cm) was used to measure each particle size of the hydrogenated block copolymer (B), and the average particle size was calculated.

Herein, the shape of each particle dispersed was irregular, and therefore the size of each particle dispersed was measured using image analysis software (Image-Pro Plus manufactured by Nippon Roper K.K.).

The longer diameter of the ellipse corresponding to a projection image of each particle was used for each particle size by use of software program.

The average particle size was defined as the average of the sizes of samples of 150 particles in the field of view.

(Tracking Performance: Evaluation of Number of Drops Until Tracking)

The pellet of the thermoplastic resin composition produced in each of Examples and Comparative Examples described later was used to provide a terminal block molded product by injection molding.

A flat portion of this terminal block molded product: 30 mm×30 mm; was cut out, an aqueous 0.1% by mass ammonium chloride solution was dropped every 30 seconds to each of the test pieces while applying voltages of 300 V, 400 V, 500 V and 600 V using a test apparatus according to IEC60112, and the number of drops dropped until the occurrence of tracking was measured.

The measurement test of the number of drops was performed five times.

The tracking performance is evaluated as below:
A (extremely good) The number of drops was 80 drops or more in more than two out of the five times the test was performed.
B (sufficiently good) The number of drops was 50 drops or more in more than two out of the five times the test was performed.
C (poor) The number of drops was less than 50 drops in any one or more out of the five times the test was performed.

(Charpy Impact Strength)

The test piece according to ISO-15103, produced as described above (production of test piece), was used, and the Charpy impact strength at each of 23° C. and −40° C. of the thermoplastic resin composition was measured according to ISO179/1eA as the Charpy impact test standard.

(Flexural Modulus)

The test piece (thickness: 4 mm) according to ISO-15103, produced as described above (production of test piece), was used, and the flexural modulus (FM) at 23° C. of the resin composition was measured according to ISO178.

(Charpy Impact Strength/Flexural Modulus: Charpy/FM Ratio)

The measurement values of the Charpy impact strength and the flexural modulus were used to calculate the Charpy impact strength/flexural modulus.

When the value was 10 or more, a balance between impact resistance and rigidity was evaluated to be good.

(Flame Retardance)

The test piece (reed-shaped test piece having a thickness of 1.5 mm) produced using the thermoplastic resin composition in each of Examples and Comparative Examples described later was used to perform the vertical burning test according to a UL94 burning test.

The reed-shaped test piece having a thickness of 1.5 mm was used, and flame-contact was performed for each of 5 samples twice, 10 times in total, according to UL94-V test, and the average number of seconds and the maximum number of seconds of the flame-out time were measured and ranked according to the criteria of UL94 burning test.

(Flame Retardance after Heat Ageing)

The test piece (reed-shaped test piece having a thickness of 1.5) produced using the thermoplastic resin composition in each of Examples and Comparative Examples described later was used to perform heat ageing in an air circulation oven set at 150° C. for 500 hours, thereafter, in the same way as in the above (flame retardance), flame-contact was performed for each of 5 samples twice, 10 times in total according to UL94-V test, and the average number of seconds and the maximum number of seconds of the flame-out time were measured and ranked according to the criteria of UL94 burning test.

(Chemical Resistance)

The chemical resistance at the time of contact with an elastomer was evaluated.

The pellet of the thermoplastic resin composition produced in each of Examples and Comparative Examples described later was used and subjected to injection molding by the method described (production of test piece) to provide a flat plate of 150 mm×150 mm×3 mm, and a strip of 10 mm×50 mm was cut out from the flat plate so that the longitudinal direction of the strip becomes perpendicular to the flowing direction of the resin, to provide a test piece.

The test piece was mounted to a bending bar, a strain of 1.5% was applied thereto, thereafter, the surface of the strip was coated with silicone 1527 produced by Beijing TONSAN Adhesive Co., Ltd., and whether cracking occurred on the surface of the strip after 48 hours or not was observed.

The occurrence of cracking was taken as a measure of the chemical resistance, and the chemical resistance was evaluated according to the following criteria.

<Evaluation Criteria of Chemical Resistance>
○: The occurrence of cracking was not visually observed.
Δ: The occurrence of microcracking was visually observed.

Example 1

(Production of Thermoplastic Resin Composition)

The above ingredients were compounded under the melting and extruding conditions shown in Table 1 below and in the amounts thereof compounded shown in Table 2 below to produce a thermoplastic resin composition as follows.

The respective ingredients were melt-kneaded using a twin screw extruder equipped with a pressure-reducing vent port (TEM58SS: manufactured by Toshiba Machine Co., Ltd.), in which the screw diameter was 58 mm and the number of barrels was 13.

In the melt-kneading, polyphenylene ether (PPE) and polystyrene (PS) (A), the hydrogenated block copolymer (SEBS-1) (B), and the titanium dioxide (D-1 above) (D) were fed via a first feed port located at a barrel 1 upstream in the flowing direction of the extruder.

Thereafter, the flame retardant (FR-1 above) (C) was fed from an injection nozzle to the side of the extruder by using a gear pump via a second (liquid) feed port located downstream of the first feed port, and a strand was extruded.

The strand extruded was cooled and cut to provide a thermoplastic resin composition pellet.

With respect to the screw structure of the extruder, an unmelted-mixing zone occupied 70% of the total barrel length.

In the melt-kneading zone, a kneading element (phase of 45 degrees) (designated as R), a kneading element (phase of 90 degrees) (designated as N) and a kneading element (negative phase of 45 degrees) (designated as L) were used.

Furthermore, in the unmelted-mixing zone, after the flame retardant (FR-1 above) (C) was fed via the second feed port, a kneading element (phase of 45 degrees) (designated as R) was used.

A vacuum degassing zone was disposed at a barrel 11, and evacuated at −900 hPa.

The second feed port via which the flame retardant (FR-1) (C) was fed was disposed at a barrel 5.

Extrusion was performed under conditions of barrel set temperatures: barrel 1: water cooling, barrel 2: 100° C., barrels 3 to 6: 200° C., barrel 7: 250° C., barrel 8: 270° C., barrels 9 to 13: 280° C., and die: 290° C.; and a number of rotations of the screw of 350 rpm and an amount discharged of 400 kg/hr.

Characteristics of the thermoplastic resin composition and the molded article obtained as described above were evaluated according to the above methods. The evaluation results are shown in Table 2.

[Examples 2 to 13], [Comparative Examples 1 to 6]

Composition was shown in Table 2 below. Other conditions were the same as those in Example 1 to produce each of thermoplastic resin composition pellets, and characteristics of each of thermoplastic resin compositions and each of molded articles were evaluated. The evaluation results are shown in Table 2.

Herein, in Table 2, Examples 1 to 13 were designated as "Ex. 1 to 13", and Comparative Examples 1 to 6 were designated as "Comp. Ex. 1 to 6".

TABLE 1

| Melting and extruding conditions | | | Examples 1-13 Comparative Examples 1-6 |
|---|---|---|---|
| Front | Front rate | % | 70 |
|  | Front barrel temperature | ° C. | 210 |
|  | Screw element |  | RR |
| Rear | Rear rate | % | 30 |
|  | Rear barrel temperature | ° C. | 290 |
|  | Screw element |  | RRNL |
|  | Number of rotations of screw | rpm | 400 |
|  | Extrusion rate | kg/hr | 400 |
|  | Position of addition of ingredient (C) |  | Barrel 5 |

TABLE 2

| (Composition) | ingredient: part(s) by mass | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| (A) | PPE | 65.0 | 65.0 | 65.0 | 80.0 | 65.0 | 60.0 | 70.0 | 65.0 | 65.0 | 65.0 |
|  | PS | 3.0 | 3.0 | 3.0 |  | 3.0 |  |  | 3.0 | 3.0 | 3.0 |
|  | HIPS |  |  |  |  |  |  | 5.0 |  |  |  |
| (B) | SEBS-1 | 15.0 | 15.0 | 15.0 | 5.0 | 15.0 | 25.0 | 15.0 | 15.0 |  |  |
|  | SEBS-2 |  |  |  |  |  |  |  |  | 15.0 |  |
|  | SEBS-3 |  |  |  |  |  |  |  |  |  | 15.0 |
| (C) | FR-1 | 17.0 | 17.0 | 17.0 | 15.0 | 17.0 | 15.0 | 10.0 | 17.0 | 17.0 | 17.0 |
| (D) | D-1 | 2.0 | 0.5 |  | 0.5 | 1.0 |  | 2.0 |  | 1.0 |  |
|  | D-2 |  |  | 1.0 |  |  | 2.0 |  | 1.0 |  | 1.0 |
| (E) | E-1 |  |  |  |  | 0.05 |  |  |  | 0.1 | 0.1 |
|  | E-2 |  |  |  |  |  |  |  |  |  | 0.1 |
| (F) | F-1 |  |  |  |  |  |  |  |  |  |  |
| (Material characteristics of composition) |  |  |  |  |  |  |  |  |  |  |  |
| Average particle size of ingredient (B) (μm) |  | — | 0.5 | — | 0.4 | 0.5 | 0.7 | — | 0.5 | 0.3 | 0.4 |
| Charpy impact strength (kJ/m²) | 23° C. | 35 | 38 | 34 | 28 | 36 | 50 | 39 | 34 | 33 | 31 |
|  | −40° C. | 17 | 22 | 15 | 12 | 19 | 27 | 22 | 14 | 14 | 13 |
| Flexural modulus (Mpa) | ISO178 | 2.48 | 2.4 | 2.32 | 2.52 | 2.52 | 1.88 | 2.3 | 2.35 | 2.33 | 2.35 |
| Charpy/Flexural modulus |  | 14 | 16 | 15 | 11 | 14 | 27 | 17 | 14 | 14 | 13 |
| Chemical resistance | silicone | ○ | ○ | ○ | ○ | ○ | ○ | ○ | ○ | Δ | ○ |
| Flame retardance | UL-94, 1.5 mm | V-0 | V-0 | V-0 | V-0 | V-0 | V-0 | V-0 | V-0 | V-0 | V-0 |
|  | UL-94, 1.5 mm after exposing at 150° C. for 500 h | V-0 | V-1 | V-0 | V-1 | V-0 | V-0 | V-0 | V-0 | V-0 | V-0 |
| (Characteristics of molded product) |  |  |  |  |  |  |  |  |  |  |  |
| Number of drops dropped until tracking | 300 V | A | B | A | B | A | A | A | A | A | A |
|  | 400 V | A | B | A | B | A | A | A | A | A | A |
|  | 500 V | A | A | A | B | A | A | A | A | A | A |
|  | 600 V | A | A | A | A | A | A | A | A | A | A |

| (Composition) | ingredient: part(s) by mass | Ex. 11 | Ex. 12 | Ex. 13 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|
| (A) | PPE | 60.0 | 65.0 | 65.0 | 60.0 | 76.0 | 45.0 | 65.0 | 60.0 | 65.0 |
|  | PS |  | 3.0 | 3.0 |  | 3.0 | 3.0 | 20.0 | 3.0 | 3.0 |
|  | HIPS |  |  |  |  |  | 5.0 |  |  |  |
| (B) | SEBS-1 | 15.0 | 15.0 | 15.0 |  | 4.0 | 32.0 | 15.0 |  | 15.0 |
|  | SEBS-2 |  |  |  | 25.0 |  |  |  |  |  |
|  | SEBS-3 |  |  |  |  |  |  |  | 10.0 |  |
| (C) | FR-1 | 23.0 | 17.0 | 17.0 | 15.0 | 17.0 | 150 | 0.0 | 27.0 | 17.0 |
| (D) | D-1 | 2.0 | 0.5 | 2.0 |  | 2.0 | 20 |  | 2.0 | 5.0 |
|  | D-2 |  |  |  |  |  |  |  |  |  |
| (E) | E-1 |  |  |  |  |  |  |  |  |  |
|  | E-2 |  | 2 |  |  |  |  |  |  |  |
| (F) | F-1 |  |  | 0.5 |  |  |  |  |  |  |

TABLE 2-continued

| (Material characteristics of composition) | | | | | | | | | | |
|---|---|---|---|---|---|---|---|---|---|---|
| Average particle size of ingredient (B) (μm) | | 0.5 | — | 0.5 | — | — | — | — | — | — |
| Charpy impact strength | 23° C. | 32 | 36 | 35 | 45 | 22 | 53 | 32 | 15 | 20 |
| (kJ/m²) | −40° C. | 14 | 13 | 17 | 22 | 7 | 37 | 17 | 6 | 7 |
| Flexural modulus (Mpa) | ISO178 | 2.22 | 2.48 | 2.49 | 1.86 | 2.68 | 1.8 | 2.28 | 2.1 | 2.56 |
| Charpy/Flexural modulus | | 14 | 15 | 18 | 12 | 20 | 29 | 14 | 7 | 8 |
| Chemical resistance | silicone | Δ | ○ | ○ | ○ | ○ | Δ | ○ | Δ | ○ |
| Flame retardance | UL-94, 1.5 mm | V-0 | V-0 | V-0 | V-0 | V-0 | V-1 | HB | V-0 | V-0 |
| | UL-94, 1.5 mm after exposing at 150° C. for 500 h | V-0 | V-0 | V-0 | HB | V-0 | V-2 | HB | V-0 | V-0 |
| (Characteristics of molded product) | | | | | | | | | | |
| Number of drops dropped until tracking | 300 V | A | A | A | C | C | A | C | A | A |
| | 400 V | A | A | A | B | C | A | C | A | A |
| | 500 V | A | A | A | B | B | A | C | A | A |
| | 600 V | A | A | A | B | B | A | C | A | A |

In each of Examples 1 to 13, a molded article excellent in tracking resistance, excellent in a balance between impact resistance and rigidity, and being capable of maintaining stable flame retardance even after heat ageing was obtained. Accordingly, it was confirmed that, by using the insulating resin molded article, even an electrical component having at least one short creepage distance of 15 mm or more and 40 mm or less could be utilized as an electrical component having an excellent tracking resistance.

The present application is based on Japanese Patent Application (Japanese Patent Application No. 2013-142097) filed with the Japan Patent Office on Jul. 5, 2013, and the content of which is herein incorporated by reference.

INDUSTRIAL APPLICABILITY

The electrical component of the present invention has industrial applicability in internal parts components of office equipment as industrial equipment, measuring equipment, chassis, and electrical equipment, electrical and electronic components for use in a wall adapter for household electrical appliances and the like, a storage medium and a drive thereof, sensor equipment, a terminal block, and a second battery, a fuel battery, a solar battery, solar power generation, geothermal generation, wind power generation, a smart meter and the like in the energy and environment fields, electrical components constituting a power transmission facility, a cable terminal, and a vehicle part, in particular, a connector for a solar battery, a junction box for a solar battery, and a component for hybrid vehicle/electrical vehicle.

REFERENCE SIGNS LIST 10 male member
11 male terminal
12 electrical cable
13 male insulating resin molded article
14 cap
15 slit
20 female member
21 female terminal
22 electrical cable
23 female insulating resin molded article
24 cap
25 snap-fit
26 opening

The invention claimed is:

1. An electrical component comprising:
a live electrical part, and
an insulating resin molded article in contact with the live electrical part, the molded article being a molded article of a thermoplastic resin composition,
wherein
the thermoplastic resin composition comprises:
(A) a polyphenylene ether-based resin or a mixed resin of a polyphenylene ether-based resin and a styrene-based resin,
(B) a hydrogenated block copolymer,
(C) a flame retardant, and
(D) titanium oxide,
a content of the (A) is 60 to 80 parts by mass,
a content of the (B) is 5 to 30 parts by mass,
a content of the (C) is 9 to 25 parts by mass, and
a content of the (D) is 0.1 to 3 parts by mass, based on the total of 100 parts by mass of the (A), (B) and (C), and
at least one creepage distance, which is a length between the live electrical part and an outer surface part of the electrical component that is electrically separated from the live electrical part by the insulating resin molded article, and which includes a length along a surface of the insulating resin molded article, is 15 mm or more and 40 mm or less.

2. The electrical component according to claim 1, wherein the flame retardant (C) is a phosphoric acid-base flame retardant.

3. The electrical component according to claim 1, wherein the hydrogenated block copolymer (B) is dispersed in the form of a particle, in the thermoplastic resin composition, and
an average particle size of the dispersed particles of the hydrogenated block copolymer (B) is 0.2 to 1.0 μm.

4. The electrical component according to claim 1, wherein a value obtained by dividing a Charpy impact strength (kJ/m²) at 23° C. of the thermoplastic resin composition by a flexural modulus (GPa) at 23° C. of the thermoplastic resin composition (Charpy impact strength/flexural modulus) is 10 or more, and
a burning level of the thermoplastic resin composition (thickness: 1.5 mm), measured according to UL94 vertical burning test, is V-0.

5. The electrical component according to claim 1, further comprising 0.01 to 1 part by mass of (E) a carbonate and/or sulfate of an alkaline earth metal based on the total of 100 parts by mass of the (A), (B) and (C).

6. The electrical component according to claim 1, wherein the content of the (A) is 65 to 75 parts by mass, the content of the (B) is 10 to 25 parts by mass and the content of the (C) is 10 to 20 parts by mass based on the total of 100 parts by mass of the (A), (B) and (C).

7. The electrical component according to claim 1, wherein a content of the (D) is 0.7 to 2.0 parts by mass based on the total of 100 parts by mass of the (A), (B) and (C).

8. The electrical component according to claim 1, wherein the mixed resin (A) of the polyphenylene ether-based resin and the styrene-based resin comprises 20% by mass or less of the styrene-based resin.

9. The electrical component according to claim 1, for use in a connector for a solar battery.

10. The electrical component according to claim 1, for use in a junction box for a solar battery.

11. The electrical component according to claim 1, for use in a wall adapter.

* * * * *